US011259279B2

(12) United States Patent
Dai et al.

(10) Patent No.: US 11,259,279 B2
(45) Date of Patent: Feb. 22, 2022

(54) DATA TRANSMISSION METHOD AND DEVICE

(71) Applicant: ZTE CORPORATION, Shenzhen (CN)

(72) Inventors: Bo Dai, Shenzhen (CN); Zhaohua Lu, Shenzhen (CN); Wei Gou, Shenzhen (CN); Yajun Zhao, Shenzhen (CN); Shuqiang Xia, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 477 days.

(21) Appl. No.: 15/506,992

(22) PCT Filed: Apr. 22, 2015

(86) PCT No.: PCT/CN2015/077228
§ 371 (c)(1),
(2) Date: Feb. 27, 2017

(87) PCT Pub. No.: WO2016/033976
PCT Pub. Date: Mar. 10, 2016

(65) Prior Publication Data
US 2017/0311291 A1 Oct. 26, 2017

(30) Foreign Application Priority Data

Sep. 2, 2014 (CN) .......................... 201410443895.6

(51) Int. Cl.
*H04W 72/04* (2009.01)
*H04L 12/26* (2006.01)
(Continued)

(52) U.S. Cl.
CPC ......... *H04W 72/04* (2013.01); *H04L 43/0811* (2013.01); *H04W 16/14* (2013.01);
(Continued)

(58) Field of Classification Search
CPC . H04W 72/04; H04W 16/14; H04W 72/0453; H04W 72/082; H04W 72/085;
(Continued)

(56) References Cited

U.S. PATENT DOCUMENTS 9,094,972 B2   7/2015 Liu et al.
2005/0147049 A1*  7/2005 Ganesan ............ H04M 1/2535
                                                370/241

(Continued)

FOREIGN PATENT DOCUMENTS

CN     101325461        12/2008
CN     101860900 A  *  10/2010
(Continued)

OTHER PUBLICATIONS

Extended European Search Report dated Aug. 17, 2017 for European Patent Application No. 15838008.9.
(Continued)

*Primary Examiner* — Umar Cheema
*Assistant Examiner* — Tony Williams
(74) *Attorney, Agent, or Firm* — Cantor Colburn LLP

(57) ABSTRACT

A data transmission method and device are described. The method includes: a first transmission node determines that a resource in a second predefined time window is available according to a detection value obtained by detection on a resource in a first predefined time window, and/or determines that the resource in the second predefined time window is available according to first feedback information or second feedback information from a second transmission node; and the first transmission node transmits data to the second transmission node by using the resource in the second predefined time window.

20 Claims, 3 Drawing Sheets

(51) Int. Cl.
  *H04W 72/08* (2009.01)
  *H04W 24/08* (2009.01)
  *H04W 24/10* (2009.01)
  *H04W 16/14* (2009.01)
  *H04L 43/0811* (2022.01)

(52) U.S. Cl.
  CPC ..... *H04W 72/0453* (2013.01); *H04W 72/082* (2013.01); *H04W 72/085* (2013.01); *H04W 24/08* (2013.01); *H04W 24/10* (2013.01)

(58) Field of Classification Search
  CPC .... H04W 24/08; H04W 24/10; H04L 43/0811
  USPC ........................................................ 709/224
  See application file for complete search history.

(56) References Cited

U.S. PATENT DOCUMENTS

| | | | |
|---|---|---|---|
| 2007/0219958 A1* | 9/2007 | Park | G06Q 30/02 |
| 2008/0298477 A1 | 12/2008 | Classon | |
| 2009/0046650 A1* | 2/2009 | Dalsgaard | H04L 1/1812 |
| | | | 370/329 |
| 2009/0196204 A1* | 8/2009 | Astely | H04L 1/1829 |
| | | | 370/280 |
| 2011/0249578 A1* | 10/2011 | Nayeb Nazar | H04L 1/0027 |
| | | | 370/252 |
| 2012/0182977 A1* | 7/2012 | Hooli | H04W 72/1278 |
| | | | 370/336 |
| 2012/0207040 A1* | 8/2012 | Comsa | H04W 72/1215 |
| | | | 370/252 |
| 2013/0021983 A1* | 1/2013 | Sadek | H04W 48/02 |
| | | | 370/329 |
| 2013/0077554 A1 | 3/2013 | Gauvreau et al. | |
| 2013/0142062 A1* | 6/2013 | Dinan | H04W 24/00 |
| | | | 370/252 |
| 2013/0156008 A1* | 6/2013 | Dinan | H04B 7/0456 |
| | | | 370/332 |
| 2013/0297779 A1 | 11/2013 | Sie et al. | |
| 2013/0322376 A1* | 12/2013 | Marinier | H04B 7/0617 |
| | | | 370/329 |
| 2014/0056278 A1* | 2/2014 | Marinier | H04W 72/1268 |
| | | | 370/330 |
| 2014/0133435 A1* | 5/2014 | Forenza | H04L 5/0023 |
| | | | 370/329 |
| 2014/0241262 A1* | 8/2014 | Novak | H04W 72/042 |
| | | | 370/329 |

FOREIGN PATENT DOCUMENTS

| | | | |
|---|---|---|---|
| CN | 102624465 | 8/2012 | |
| CN | 102695265 | 9/2012 | |
| EP | 2330856 | 12/2009 | |
| EP | 2606694 B1 * | 7/2014 | ............ H04W 48/10 |
| JP | 6002245 B2 * | 10/2016 | ........ H04W 72/0446 |
| KR | 101184873 | 9/2012 | |
| WO | 2012/021879 A2 | 2/2012 | |
| WO | 2013/006840 A1 | 1/2013 | |
| WO | WO-2013086362 A1 * | 6/2013 | ............ H04W 72/02 |

OTHER PUBLICATIONS

International Search Report for PCT/CN2015/077228, English Translation attached to original, Both completed by the Chinese Patent Office on Jul. 4, 2015 All together 7 Pages.

* cited by examiner

DATA TRANSMISSION METHOD AND DEVICE

CROSS-REFERENCE TO RELATED APPLICATION

This application is the U.S. national phase of PCT Application No. PCT/CN2015/077228 filed Apr. 22, 2015, which claims priority to Chinese Application No. 201410443895.6 filed Sep. 2, 2014, the disclosures of which are incorporated in their entirety by reference herein.

TECHNICAL FIELD

The present disclosure relates to the field of mobile communications and in particular to a data transmission method and device.

BACKGROUND

In a wireless cellular communication system, a base station (BS) or an evolved Node B (eNB) is a device for providing wireless access to a user equipment (UE) or a mobile terminal. The BS or eNB performs wireless communication with the UE or mobile terminal through electromagnetic waves. One base station may provide one or more serving cells, and the wireless communication system may provide wireless coverage to UE or mobile terminals within a certain geographical range.

Due to the limitation of spectrum resources, in order to provide higher data transmission rate, people pay more and more attention to non-grant spectrum, and how to use the non-grant spectrum efficiently becomes an urgent problem to be solved.

SUMMARY

Embodiments of the present disclosure propose a data transmission method and device which can effectively utilize non-grant spectrum resources to transmit data and thus improve data transmission efficiency.

An embodiment of the present disclosure proposes a data transmission method, includes that:

a first transmission node determines that a resource within a second predefined time window is available according to a detection value obtained by performing detection on a resource within a first predefined time window and/or determines that the resource within the second predefined time window is available according to first feedback information and/or second feedback information from a second transmission node; and the first transmission node transmits data to the second transmission node using the resource within the second predefined time window.

In an exemplary embodiment, when the first transmission node determines that the resource within the second predefined time window is unavailable according to the detection value obtained by performing the detection on the resource within the first predefined time window, the first transmission node re-determines the first predefined time window and the second predefined time window and continues to perform a step of determining whether a resource within the re-determined second predefined time window is available.

In an exemplary embodiment, when the first transmission node determines that the resource within the second predefined time window is unavailable according to the first feedback information, the first transmission node re-determines the first predefined time window and the second predefined time window and continues to perform the step of determining whether the resource within the re-determined second predefined time window is available, or, the first transmission node does not transmit data to the second transmission node within the second predefined time window, or, does not transmit data to the second transmission node any more before determining that the resource within the second predefined time window is available according to the first feedback information.

In an exemplary embodiment, when the first transmission node determines that the resource within the second predefined time window is unavailable according to the second feedback information, the first transmission node does not transmit data to the second transmission node within the second predefined time window;

or, the first transmission node does not transmit data to the second transmission node any more before the first transmission node receives the first feedback information or determines that the resource within the second predefined time window is unavailable according to the first feedback information;

or, the first transmission node transmits data to the second transmission node within the second predefined time window again, with a power for transmitting the data being lower than a power for transmitting data before the second feedback information is received or a power for transmitting the data being reduced to a specific value.

In an exemplary embodiment, when the first transmission node determines that a sub-band for transmitting data in the resource within the second predefined time window is unavailable according to the second feedback information, the first transmission node transmits data to the second transmission node over another sub-band in the resource within the second predefined time window; and when the second feedback information indicates to lower a transmission power, the first transmission node transmits data to the second transmission node within the second predefined time window again, with the power for transmitting the data being lower than the power for transmitting data before the second feedback information is received.

In an exemplary embodiment, the second predefined time window is later than the first predefined time window.

In an exemplary embodiment, the first transmission node receives the first feedback information according to configuration information; and/or, the first transmission node receives the second feedback information after transmitting data.

In an exemplary embodiment, when the resource within the second predefined time window is available, before the first transmission node transmits data to the second transmission node using the resource within the second predefined time window, the method further includes that:

the first transmission node transmits a synchronization signal and/or broadcast channel within the second predefined time window, herein the synchronization signal is transmitted periodically within the second predefined time window and the broadcast channel is transmitted merely once at a front end of the second predefined time window or after a first synchronization signal is transmitted.

In an exemplary embodiment, the first feedback information includes one of the following:

whether the resource within the second predefined time window is available;

a detection value of a resource within a third predefined time window; and whether the detection value of the resource within the third predefined time window is less than a second threshold.

In an exemplary embodiment, the second feedback information includes one of the following:

acknowledgement message ACK/non-acknowledgement message NACK;

occupation information about the resource within the second predefined time window;

a specific signal is detected over the resource within the third predefined time window;

whether the resource within the second predefined time window is available;

a detection value of the resource within the third predefined time window; whether the detection value of the resource within the third predefined time window is less than a second threshold;

availability information about a system bandwidth resource corresponding to the resource within the second predefined time window;

channel state information CSI corresponding to the resource within the second predefined time window;

CSI for a bandwidth for transmitting data;

type information of a detected signal;

cell identity information corresponding to the detected signal;

transmission power indicator; and interference intensity indicator.

In an exemplary embodiment, before the method, it further includes that:

the first transmission node transmits configuration information to the second transmission node.

In an exemplary embodiment, the configuration information includes one or more of detection period, information corresponding to a detected resource, frequency point information, system bandwidth, time frequency location of a reference signal corresponding to a detected resource, feedback mode information, feedback trigger information.

In an exemplary embodiment, the first transmission node transmits configuration information to the second transmission node over a subframe of a grant component carrier.

In an exemplary embodiment, the first transmission node receives the first feedback information from the second transmission node over a grant resource; and/or, the first transmission node receives the second feedback information from the second transmission node over a grant resource or non-grant resource.

In an exemplary embodiment, when the second transmission node performs interference or energy detection on the detected resource in the configuration information, the first transmission node does not transmit data over the detected resource in the configuration information.

An embodiment of the present disclosure also proposes a data transmission method, including that:

a second transmission node performs detection on a resource within a first predefined time window according to configuration information received from a first transmission node to obtain first feedback information, or, the second transmission node performs detection on a resource corresponding to the first transmission node transmitting data to obtain second feedback information and transmits the obtained first feedback information or second feedback information to the first transmission node.

In an exemplary embodiment, the configuration information includes one or more of detection period, detected resource relevant information, frequency point information, system bandwidth, feedback method, time frequency location of a reference signal corresponding to a detected resource, feedback trigger information.

In an exemplary embodiment, the second transmission node transmits the obtained first feedback information or second feedback information to the first transmission node when detecting that the detected resource in the configuration information is idle or detecting a specific signal or receiving a trigger signaling from the first transmission node.

In an exemplary embodiment, the second transmission node transmits the second feedback information to the first transmission node after receiving data.

In an exemplary embodiment, the method further includes:

the second transmission node receives a synchronization signal and/or broadcast channel within the second predefined time window, herein the synchronization signal is received periodically within the second predefined time window and the broadcast channel is received merely once at a front end of the second predefined time window or after a first synchronization signal is received.

In an exemplary embodiment, the configuration information includes current state information about the first transmission node; and the method further includes that: when the second transmission node detects that the state information in the configuration information is mute state, the second transmission node does not transmit the first feedback information or the second feedback information.

In an exemplary embodiment, the second transmission node transmits the obtained first feedback information or second feedback information to the first transmission node over a grant component carrier.

In an exemplary embodiment, the second transmission information transmits the obtained first feedback information or second feedback information to the first transmission node over a subframe (n+k) of the grant component carrier;

herein subframe n is a subframe by which the first transmission node transmits feedback trigger information or a subframe by which the first transmission node transmits data and k is 1, 2, 3 or 4 or determined according to the uplink and downlink resource configuration of the grant component carrier.

In an exemplary embodiment, the second transmission node transmits the obtained first feedback information or second feedback information over a non-grant component carrier in a broadcast manner.

In an exemplary embodiment, the first feedback information includes:

whether the detected resource in the configuration information or the system bandwidth resource corresponding to the detected resource is available, or a detection value of the detected resource or the system bandwidth resource corresponding to the detected resource, or whether the detection value of the detected resource or the system bandwidth resource corresponding to the detected resource is less than a second threshold.

In an exemplary embodiment, the second feedback information includes one of the following:

acknowledgement message ACK/non-acknowledgement message NACK;

occupation information about the resource within the second predefined time window;

a specific signal is detected over a resource within a third predefined time window;

whether the resource within the second predefined time window is available;

a detection value of the resource within the third predefined time window;

whether the detection value of the resource within the third predefined time window is less than a second threshold;

availability information about a system bandwidth resource corresponding to the resource within the second predefined time window;

CSI corresponding to the resource within the second predefined time window;

CSI for a bandwidth for transmitting data;

type information of a detected signal;

cell identity information corresponding to the detected signal;

transmission power indicator; and interference intensity indicator.

An embodiment of the present disclosure also proposes a data transmission device, including:

a determination module, arranged to determine that a resource within a second predefined time window is available according to a detection value obtained by performing detection on a resource within a first predefined time window and/or determines that the resource within the second predefined time window is available according to first feedback information or second feedback information from a second transmission node and transmits a determination result to a transmission module; and the transmission module, arranged to transmit data to the second transmission node using the resource within the second predefined time window.

In an exemplary embodiment, the determination module is further arranged to:

when it is determined that the resource within the second predefined time window is unavailable according to the detection value obtained by performing the detection on the resource within the first predefined time window, re-determine the first predefined time window and the second predefined time window and continue to determine whether a resource within the re-determined second predefined time window is available.

In an exemplary embodiment, the determination module is further arranged to:

when it is determined that the resource within the second predefined time window is unavailable according to the first feedback information, re-determine the first predefined time window and the second predefined time window and continue to determine whether the resource within the re-determined second predefined time window is available.

In an exemplary embodiment, the transmission module is further arranged to: when the determination module determines that the resource within the second predefined time window is unavailable according to the first feedback information, not transmit data to the second transmission node within the second predefined time window; or, transmit data to the second transmission node any more before the determination module determines that the resource within the second predefined time window is available according to the first feedback information.

In an exemplary embodiment, the determination module is further arranged to determine that the resource within the second predefined time window is unavailable according to the second feedback information; and the transmission module is further arranged to: not transmit data to the second transmission node within the second predefined time window; or, not transmit data to the second transmission node any more before the determination module receives the first feedback information or determines that the resource within the second predefined time window is available according to the first feedback information; or transmit data to the second transmission node within the second predefined time window again, with a power for transmitting the data being lower than a power for transmitting data before the second feedback information is received or a power for transmitting the data being reduced to a specific value.

In an exemplary embodiment, the determination module is further arranged to determine that a sub-band for transmitting data in the resource within the second predefined time window is unavailable according to the second feedback information; and the transmission module is further arranged to: transmit data to the second transmission data over another sub-band in the resource within the second predefined time window; when the second feedback information indicates to lower a transmission power, transmit data to the second node within the second predefined time window again, with the power for transmitting the data being lower than the power for transmitting data before the second feedback information is received.

In an exemplary embodiment, the second predefined time window is later than the first predefined time window.

In an exemplary embodiment, the determination module is further arranged to determine whether the resource within the second predefined time window is available; and the transmission module is further arranged to transmit a synchronization signal and/or broadcast channel within the second predefined time window when the determination module determines that the resource within the second predefined time window is available and before transmitting data to the second transmission node using the resource within the second predefined time window, herein the synchronization signal is transmitted periodically within the second predefined time window and the broadcast channel is transmitted merely once at a front end of the second predefined time window or after a first synchronization signal is transmitted.

In an exemplary embodiment, the first feedback information includes one of the following:

whether the resource within the second predefined time window is available;

a detection value of a resource within a third predefined time window; and whether the detection value of the resource within the third predefined time window is less than a second threshold.

In an exemplary embodiment, the second feedback information includes one of the following:

acknowledgement message ACK/non-acknowledgement message NACK;

occupation information about the resource within the second predefined time window;

a specific signal is detected over the resource within the third predefined time window;

whether the resource within the second predefined time window is available;

a detection value of the resource within the third predefined time window;

whether the detection value of the resource within the third predefined time window is less than a second threshold;

availability information about a system bandwidth resource corresponding to the resource within the second predefined time window;

channel state information CSI corresponding to the resource within the second predefined time window;

CSI for the bandwidth for transmitting data;

type information of a detected signal;

cell identity information corresponding to the detected signal;

transmission power indicator; and interference intensity indicator.

In an exemplary embodiment, the transmission module is further arranged to: transmit configuration information to the second transmission node.

In an exemplary embodiment, the configuration information includes one or more of detection period, information corresponding to a detected resource, frequency point information, system bandwidth, time frequency location of a reference signal corresponding to a detected resource, feedback mode information, feedback trigger information.

In an exemplary embodiment, the transmission module is further arranged to: transmit configuration information to the second transmission node over a subframe of a grant component carrier.

In an exemplary embodiment, the device further includes a receiving module arranged to receive the first feedback information from the second transmission node over the grant resource; and/or, receive the second feedback information from the second transmission node over a grant resource or non-grant resource.

In an exemplary embodiment, the receiving module is arranged to: receive the first feedback information according to configuration information; and/or, receive the second feedback information after transmitting data.

In an exemplary embodiment, the transmission module is further arranged to: when the second transmission node performs interference or energy detection on the detected resource in the configuration information, not transmit data over the detected resource in the configuration information.

An embodiment of the present disclosure also proposes a data transmission device, including:

a receiving module arranged to receive configuration information from a first transmission node;

a detection module arranged to perform detection on a resource within a first predefined time window according to received configuration information to obtain first feedback information, or, perform detection on a resource corresponding to the first transmission node transmitting data to obtain second feedback information; and a transmission module arranged to transmit the obtained feedback information to the first transmission node.

In an exemplary embodiment, the configuration information includes one or more of detection period, detected resource relevant information, frequency point information, system bandwidth, feedback method, time frequency location of a reference signal corresponding to a detected resource, feedback trigger information.

In an exemplary embodiment, the transmission module is arranged to:

transmit the obtained first feedback information or second feedback information to the first transmission node when the detection module detects that the detected resource in the configuration information is idle or detects a specific signal or receives a trigger signaling from the first transmission node.

In an exemplary embodiment, the transmission module is further arranged to:

transmit the second feedback information to the first transmission node after receiving data.

In an exemplary embodiment, the receiving module is further arranged to:

receive a synchronization signal and/or broadcast channel within the second predefined time window, herein the synchronization signal is received periodically within the second predefined time window and the broadcast channel is received merely once at a front end of the second predefined time window or after a first synchronization signal is received.

In an exemplary embodiment, the detection module is further arranged to detect whether the state information in the configuration information is mute state; and the transmission module is further arranged to: when the detection module detect that the state information in the configuration information is mute state, not transmit the first feedback information or the second feedback information.

In an exemplary embodiment, the transmission module is arranged to:

transmit the obtained first feedback information or second feedback information to the first transmission node over a grant component carrier.

In an exemplary embodiment, the transmission module is arranged to:

transmit the obtained first feedback information or second feedback information to the first transmission node over a subframe (n+k) of the grant component carrier; where n is a subframe by which the first transmission node transmits feedback trigger information or a subframe by which the first transmission node transmits data and k is 1 or 2 or 3 or 4 or determined according to the uplink and downlink resource configuration of the grant component carrier.

In an exemplary embodiment, the transmission module is arranged to:

transmit the obtained first feedback information or second feedback information over a non-grant component carrier in a broadcast manner.

In an exemplary embodiment, the first feedback information includes:

whether the detected resource in the configuration information or the system bandwidth resource corresponding to the detected resource is available, or a detection value of the detected resource or the system bandwidth resource corresponding to the detected resource, or whether the detection value of the detected resource or the system bandwidth resource corresponding to the detected resource is less than a second threshold.

In an exemplary embodiment, the second feedback information includes one of the following:

acknowledgement message ACK/non-acknowledgement message NACK;

occupation information about the resource within the second predefined time window;

a specific signal is detected over a resource within a third predefined time window;

whether the resource within the second predefined time window is available;

a detection value of the resource within the third predefined time window;

whether the detection value of the resource within the third predefined time window is less than a second threshold;

availability information about a system bandwidth resource corresponding to the resource within the second predefined time window;

CSI corresponding to the resource within the second predefined time window;

CSI for a bandwidth for transmitting data;

type information of a detected signal;

cell identity information corresponding to the detected signal;

transmission power indicator; and interference intensity indicator.

An embodiment of the present disclosure also provides a computer storage medium storing program instructions, which, when being executed, are enabled to perform the above methods.

Compared to the conventional art, an embodiment of the present disclosure includes: a first transmission node determines that a resource within a second predefined time window is available according to a detection value obtained by performing detection on a resource within a first predefined time window and/or determines that the resource within the second predefined time window is available according to first feedback information or second feedback information from a second transmission node; and the first transmission node transmits data to the second transmission node using the resource within the second predefined time window. By means of the solution in the embodiments of the present disclosure, the resource within the second predefined time window (including a grant spectrum resource and a non-grant spectrum resource) is effectively utilized to transmit data, improving data transmission efficiency.

DETAILED DESCRIPTION

The embodiments of the present application and the features in the embodiments may be combined with each other arbitrarily without conflicts.

Embodiment 1

Figure 1:
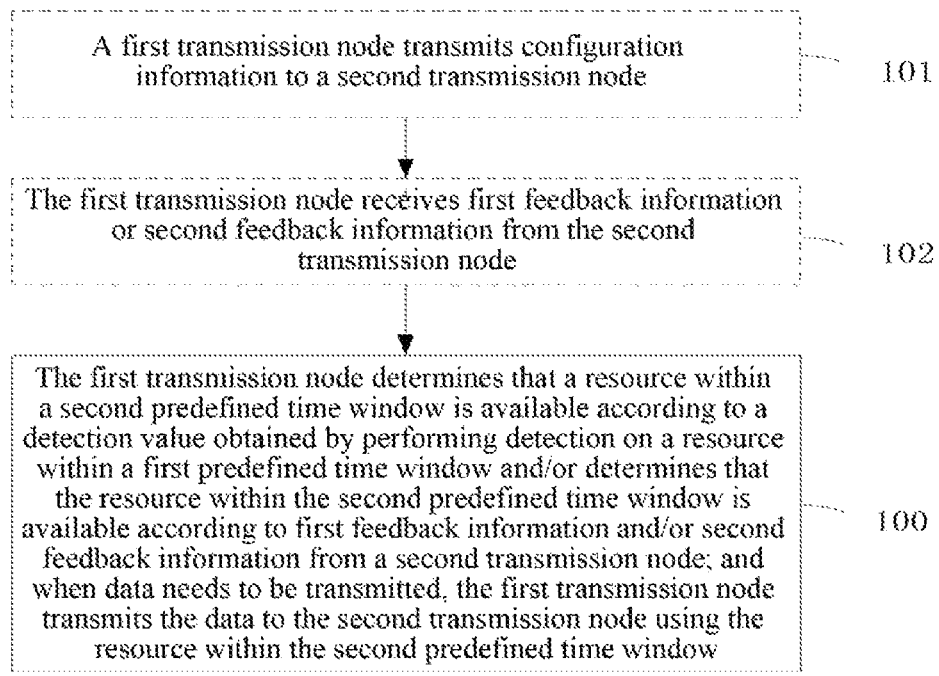
FIG. 1 is a flowchart of a data transmission method according to embodiment 1 of the present disclosure.

Referring to FIG. 1, an embodiment of the present disclosure proposes a data transmission method, including:

in step 100, a first transmission node determines that a resource within a second predefined time window is available according to a detection value obtained by performing detection on a resource within a first predefined time window, and/or determines that the resource within the second predefined time window is available according to first feedback information or second feedback information from a second transmission node; and the first transmission node transmits data to the second transmission node using the resource within the second predefined time window.

In this step, the first transmission node is a base station, or a user equipment, or a relay node, or other type of transmission node; and the second transmission node is a base station, or a user equipment, or a relay node, or other type of transmission node.

In this step, when the first transmission node determines that the resource within the second predefined time window is unavailable according to the detection value obtained by performing the detection on the resource within the first predefined time window, the first transmission node re-determines the first predefined time window and the second predefined time window and continues to perform the step of determining whether the resource within the re-determined second predefined time window is available.

In this step, when the first transmission node determines that the resource within the second predefined time window is unavailable according to the first feedback information, the first transmission node re-determines the first predefined time window and the second predefined time window and continues to perform the step of determining whether the resource within the re-determined second predefined time window is available, or, the first transmission node does not transmit data to the second transmission node within the second predefined time window; or, the first transmission node does not transmits data to the second transmission node any more before determining that the resource within the second predefined time window is available according to the first feedback information.

In this step, when the first transmission node determines that the resource within the second predefined time window is unavailable according to the second feedback information, the first transmission node does not transmit data to the second transmission node within the second predefined time window; or, the first transmission node does not transmit data to the second transmission node any more before the first transmission node receives the first feedback information or determines that the resource within the second predefined time window is available according to the first feedback information; or the first transmission node transmits data to the second transmission node within the second predefined time window again, with a power for transmitting the data being lower than a power for transmitting before the second feedback information is received or a power for transmitting the data being reduced to a specific value.

In this step, when the first transmission node determines that a sub-band for transmitting data in the resource within the second predefined time window is unavailable according to the second feedback information, the first transmission node transmits data to the second transmission node over another sub-band in the resource within the second predefined time window; and when the second feedback information indicates to lower the transmission power, the first transmission node transmits data to the second transmission node within the second predefined time window again, with the power for transmitting the data being lower than the power for transmitting the data before the second feedback information is received.

In this step, the second predefined time window is later than the first predefined time window.

In this step, the first transmission node receives the first feedback information according to configuration information; and/or, the first transmission node receives the second feedback information after transmitting data.

In this step, the first transmission node determines whether the detection value obtained by performing detection on the resource within the first predefined time window is less than a first threshold, and for the detection value of interference information, when it is less than the first threshold, then the first transmission node determines that the resource within the second predefined time window is available, and when it is greater than or equal to the first threshold, then the first transmission node determines that the resource within the second predefined time window is unavailable; and for the detection value of channel quality information or energy, when it is less than the first threshold, then the first transmission node determines that the resource within the second predefined time window is unavailable, and when it is greater than or equal to the first threshold, then the first transmission node determines that the resource within the second predefined time window is available.

Herein, the first threshold is determined according to one or more of data transmission mode, system bandwidth, transmission node type, frequency point, and detected signal type.

Herein, the first transmission node stores the correspondence between one or more of data transmission mode, system bandwidth, transmission node type, frequency point, and detected signal type, and the first threshold.

In this step, the resource within the first predefined time window or the second predefined time window is a grant resource and/or non-grant resource.

Herein, the grant resource may be spectrum bought by the operators or dedicated spectrum (such as radar-specific spectrum), and the non-grant resource may be spectrum corresponding to WiFi and so on.

In this step, the first feedback information at least includes one of the following:

whether the resource within the second predefined time window is available;

a detection value of a resource within a third predefined time window; and whether the detection value of the resource within the third predefined time window is less than a second threshold.

Herein, the third predefined time window is a time window corresponding to the resource corresponding to the data, and/or a time window corresponding to the first predefined time window and/or the second predefined time window starting to receiving data.

Herein, the detection value may be a detection value for channel quality information or interference information, or an energy detection value.

In this step, the second feedback information at least includes one of the following:

acknowledgement message ACK/non-acknowledgement message NACK;

occupation information about the resource within the second predefined time window;

a specific signal is detected over a resource within a third predefined time window;

whether the resource within the second predefined time window is available;

a detection value of the resource within the third predefined time window; and whether the detection value of the resource within the third predefined time window is less than a second threshold;

availability information about a system bandwidth resource corresponding to the resource within the second predefined time window (which may be full bandwidth or M sub-bands or sub-bands corresponding to the resource within the second predefined time window);

channel state information CSI corresponding to the resource within the second predefined time window;

CSI for bandwidth for transmitting data (which may be CSI for full bandwidth, or CSI for best M sub-bands, or CSI for sub-bands and so on);

type information of a detected signal;

cell identity information corresponding to the detected signal;

transmission power indicator; and interference intensity indicator and so on.

Herein, CSI includes one or more of Precoding Matrix Indicator (PMI), Rank Indication (RI) and Channel Quality Indication (CQI).

Herein, the second threshold is determined according to one or more of data transmission mode, system bandwidth, transmission node type, frequency point, and detected signal type.

Herein, the first transmission node or second transmission node stores the correspondence between one or more of data transmission mode, system bandwidth, transmission node type, frequency point, and detected signal type, and the second threshold.

Herein, the first threshold or the second threshold is determined according to one or more of data transmission mode, system bandwidth, transmission node type, frequency point, and detected signal type, including:

different transmission modes correspond to different first thresholds or second thresholds, for example, BF (Beamforming) (single port) transmission corresponds to first threshold 1 or second threshold 1 and other transmission methods such as transmission diversity corresponds to first threshold 2 or second threshold 2;

different system bandwidths correspond to different first thresholds or second thresholds, for example, system bandwidth 1 corresponds to first threshold 3 or second threshold 3 and system bandwidth 2 corresponds to first threshold 4 or second threshold 4;

different transmission node types correspond to different first thresholds or second thresholds, for example, base station detection corresponds to first threshold 5 or second threshold 5 and terminal detection corresponds to first threshold 6 or second threshold 6;

different frequency points correspond to different first thresholds or second thresholds, for example, 5G frequency point corresponds to first threshold 7 or second threshold 7 and 3G frequency point corresponds to first threshold 8 or second threshold 8;

different detected signal information corresponds to different first thresholds or second thresholds, for example, the detected signal information being maximum power value 1 corresponds to first threshold 9 or second threshold 9 and the detected signal information being maximum power value 2 corresponds to first threshold 10 or second threshold 10; and the above methods may be combined arbitrarily, and the first threshold and the second threshold may be the same or may be different.

The first threshold and the second threshold may be agreed by the first transmission node and the second transmission node and may be configured separately.

In this step, when the first feedback information or the second feedback information is that the resource within the second predefined time window is unavailable, then the first transmission node determines that the resource within the second predefined time window is unavailable; and when the first feedback information or the second feedback information is that the resource within the second predefined time window is available, then the first transmission node determines that the resource within the second predefined time window is available.

When the first feedback information or the second feedback information is a detection value of the resource within the second predefined time window, then the first transmission node determines whether the detection value in the first feedback information or the second feedback information is less than a second threshold, and for the detection value of interference information, when it is less than the second threshold, then the first transmission node determines that the resource within the second predefined time window is available, and when it is greater than or equal to the second threshold, then the first transmission node determines that the resource within the second predefined time window is unavailable; and for the detection value of channel quality information or energy, when it is less than the second threshold, then the first transmission node determines that the resource within the second predefined time window is unavailable, and when it is greater than or equal to the second threshold, then the first transmission node determines that the resource within the second predefined time window is available.

Herein, the first transmission node stores the correspondence between one or more of data transmission mode, system bandwidth, transmission node type, frequency point, and detected signal type, and the second threshold.

When the first feedback information or the second feedback information is that a detection value of the resource within the second predefined time window is less than a second threshold, for the detection value of interference information, then the first transmission node determines that the resource within the second predefined time window is available, and for the detection value of channel quality information or energy, then the first transmission node determines that the resource within the second predefined time window is unavailable, and when the first feedback information or the second feedback information is that a detection value of the resource within the second predefined time window is greater than or equal to the second threshold, for the detection value of interference information, then the first transmission node determines that the resource within the second predefined time window is unavailable, and for the detection value of channel quality information or energy, then the first transmission node determines that the resource within the second predefined time window is available.

When the second feedback information is that a specific signal is detected over a resource within a third predefined time window, then the first transmission node determines that the resource within the second predefined time window is unavailable.

The second transmission node performs detection within the first predefined time window to obtain the second feedback information, or, the second transmission node performs detection within in the second predefined time window to obtain the second feedback information, or the second transmission node performs detection on a resource corresponding to the first transmission node transmitting data to obtain the second feedback information.

In this step, the length of the second predefined time window may be determined according to traffic and shall not exceed a predefined maximum value; the length of the first predefined time window may be a predefined value or may be determined according to the first feedback information, or there is an initial default value, and in the following, the length of the first predefined time window may be determined according to the detection information within a previous window.

In this step, when the resource within the second predefined time window is available, before the first transmission node transmits data to the second transmission node using the resource within the second predefined time window, the method further includes that:

the first transmission node transmits a synchronization signal and/or broadcast channel within the second predefined time window, herein the synchronization signal is transmitted periodically within the second predefined time window and the broadcast channel is transmitted merely once at the front end of the second predefined time window or after a first synchronization signal is transmitted.

For example, the synchronization signal may be transmitted with T milliseconds as a period and is located on the first OFDM symbol and/or the second OFDM symbol of the second predefined time window, and the broadcast channel is located on the first to $h^{th}$ OFDM symbols after the synchronization channel, herein h is a positive integer, and T is a positive integer and may be 5 or 10; or, the first transmission node transmits the broadcast channel within the second predefined time window and the broadcast channel is located on the first to $h^{th}$ OFDM symbols of the second predefined time window.

Herein, the synchronization signal is transmitted with a predefined bandwidth of the central frequency point of the system bandwidth, and the broadcast signal is transmitted with a predefined bandwidth of the central frequency point of the system bandwidth, such as 1.4M, 5M and so on, the predefined bandwidth being less than or equal to the system bandwidth.

The synchronization signal includes: Primary Synchronization Signal (PSS) and/or Secondary Synchronization Signal (SSS); and the broadcast channel includes: Physical Broadcast Channel (PBCH).

In this step, the feedback stages of the first feedback information and the second feedback information are different, for example, the first feedback information is used for determining whether the first transmission node may transmit data initially and the second feedback information is used for determining whether the first transmission node may continue transmitting data after sending data.

In this step, the first feedback information and the second feedback information may be the same or may be different, for example, the first feedback information does not include ACK/NACK and the second feedback information may include ACK/NACK.

In the data transmission method according to an embodiment of the present disclosure, when determining whether the resource within the second predefined time window is available according to the first feedback information or second feedback information from the second transmission node, before the method, it further includes:

in step 101, the first transmission node transmits configuration information to the second transmission node.

In this step, the configuration information includes one or more of detection period, information corresponding to a detected resource, frequency point information, system bandwidth, time frequency location of a reference signal corresponding to a detected resource, feedback mode information, and feedback trigger information.

In this step, the first transmission node may transmit configuration information to the second transmission node over a subframe of a grant component carrier.

In step 102, the first transmission node receives the first feedback information or second feedback information from the second transmission node.

In this step, the first transmission node receives the first feedback information from the second transmission node over a grant resource; and/or, the first transmission node receives the second feedback information from the second transmission node over a grant resource or non-grant resource.

In this step, the first feedback information or the second feedback information may be periodical feedback or non-periodical feedback.

Herein, periodical feedback may be that: an idle state is detected within a period of time and reported once (it can be reported at any time within the period of time, and when no idle state is detected, then no reporting may be performed) or periodical feedback is performed according to period and offset (no matter whether there is an idle state, feedback will be performed); and the feedback period is relevant to the detection time window of the first transmission node so as to ensure that feedback is performed at the start of the detection time window of the first transmission node as far as possible.

When the first transmission node is in a mute state, then the second transmission node does not perform detection and feedback.

Non-periodical feedback includes: detection is performed all the time and reporting is performed at any time (UE performs reporting whenever detecting an idle resource), or whenever a specific signal is detected (such as an occupation signal/request signal), reporting will be performed immediately and feedback will be performed, or the first transmission node transmits signaling to trigger the second transmission node to perform feedback.

When the first transmission node triggers the second transmission node to perform feedback over a subframe n of a grant carrier and the second transmission node needs to perform channel state measurement, the time frequency location of the reference signal corresponding to the measurement is configured by the first transmission node, or the time frequency location of the reference signal corresponding to the measurement is predefined, and the time frequency location may be located on the last one or two OFDM symbols of a non-grant carrier subframe n.

The first feedback information or the second feedback information may be fed back over a subframe n+k of the grant carrier, k may be 1, 2, 3, 4 or determined according to the uplink and downlink resource configuration of the grant carrier, may also be transmitted merely over several OFDM symbols and may also be transmitted within the entire subframe.

The time domain location of the first feedback information or the second feedback information may be located on first n OFDM symbols in the subframe and may also be throughout the entire subframe.

In this step, the first transmission node may receive the second feedback information from the second transmission node after transmitting data to the second transmission node within the second predefined time window.

In this step, when the second transmission node performs interference or energy detection on the detected resource in the configuration information, the first transmission node does not transmit data over the detected resource in the configuration information.

Embodiment 2

An embodiment of the present disclosure also proposes a data transmission method, includes that:

a second transmission node performs detection on a resource within a first predefined time window according to configuration information received from a first transmission node to obtain first feedback information, or, the second transmission node performs detection on a resource corresponding to the first transmission node transmitting data to obtain second feedback information and transmits the obtained first feedback information or second feedback information to the first transmission node.

Herein, the first transmission node is a base station, or a user equipment, or a relay node, or other type of transmission node; and the second transmission node is a base station, or a user equipment, or a relay node, or other type of transmission node.

Herein, the configuration information includes one or more of detection period, detected resource relevant information, frequency point information, system bandwidth, feedback method, time frequency location of a reference signal corresponding to a detected resource, feedback trigger information.

Herein, the second transmission node transmits the first feedback information or second feedback information to the first transmission node when detecting that the detected resource in the configuration information is idle or detecting a specific signal or receiving a trigger signaling from the first transmission node.

Herein, the detection value of the detected resource in the configuration information is the detection value of interference information, the second transmission node detecting that the detected resource in the configuration information is idle includes:

the second transmission node determines that the detection value of the detected resource in the configuration information is less than a second threshold.

Herein, the detection value of the detected resource in the configuration information is the detection value of channel quality information or energy, the second transmission node detecting that the detected resource in the configuration information is idle includes:

the second transmission node determines that the detection value of the detected resource in the configuration information is greater than or equal to a second threshold.

Herein, the second transmission node transmits the second feedback information to the first transmission node after receiving data.

Herein, the configuration information includes current state information about the first transmission node; and when the second transmission node detects that the state information in the configuration information is mute state, the second transmission node does not transmit the first feedback information or the second feedback information.

Herein, the second transmission node may transmit the obtained first feedback information or second feedback information to the first transmission node over a grant component carrier.

Herein, the second transmission node transmits the obtained first feedback information or second feedback information to the first transmission node over a subframe (n+k) of the grant component carrier; herein n is the subframe by which the first transmission node transmits feedback trigger information or the subframe by which the first transmission node transmits data and k is 1 or 2 or 3 or 4 or determined according to the uplink and downlink resource configuration of the grant component carrier.

Herein, the second transmission node may also transmit the obtained first feedback information or second feedback information over a non-grant component carrier in a broadcast manner. In this way, other transmission nodes will not occupy the detected resource.

Herein, the second transmission node may contain an acknowledgement character (ACK)/non-acknowledgement character (NACK) in the second feedback information for transmitting to the first transmission node.

Herein, the second threshold is determined according to one or more of data transmission mode, system bandwidth, transmission node type, frequency point, and detected signal type.

Herein, the first feedback information includes one of the following:

whether the detected resource in the configuration information or the system bandwidth resource corresponding to the detected resource is available, or a detection value of the detected resource or the system bandwidth resource corresponding to the detected resource, or whether the detection value of the detected resource or the system bandwidth resource corresponding to the detected resource is less than a second threshold.

Herein, the detection value may be a detection value of channel quality information (such as channel quality indicator CSI corresponding to detected resource or CSI of the system bandwidth corresponding to detected resource, type information of a detected signal, cell identity information corresponding to the detected signal, transmission power of the detected signal and so on) and/or interference information (such as interference intensity and so on).

The second feedback information includes one of the following:

acknowledgement message ACK/non-acknowledgement message NACK;

occupation information about the resource within the second predefined time window;

a specific signal is detected over a resource within a third predefined time window;

whether the resource within the second predefined time window is available;

a detection value of the resource within the third predefined time window; and whether the detection value of the resource within the third predefined time window is less than a second threshold;

availability information about a system bandwidth resource corresponding to the resource within the second predefined time window (which may be full bandwidth or M sub-bands or sub-bands corresponding to the resource within the second predefined time window);

CSI corresponding to the resource within the second predefined time window;

CSI for a bandwidth corresponding to the resource within the second predefined time window (which may be CSI for full bandwidth, or CSI for best M sub-bands, or CSI for sub-bands and so on)

type information of a detected signal;

cell identity information corresponding to the detected signal, or transmission power indicator;

interference intensity indicator and so on.

When the first feedback information or the second feedback information is whether the detected resource in the configuration information or the system bandwidth resource corresponding to the detected resource is available or whether the detection value of the detected resource or the system bandwidth resource corresponding to the detected resource is less than the second threshold, the second transmission node stores the correspondence between one or more of data transmission mode, system bandwidth, transmission node type, frequency point, and detected signal type, and the second threshold.

Herein, when the first transmission node triggers the second transmission node to perform feedback over a subframe n of a grant carrier and the second transmission node needs to perform channel state measurement, the second transmission node measures a specific reference signal at the configuration time frequency location of the first transmission node, or the second transmission node measures a specific reference signal at a predefined time frequency location, and the predefined time frequency location includes: on the last one or two OFDM symbols of a non-grant carrier subframe n.

Herein, the time domain location for transmitting the first feedback information may be first n OFDM symbols in the subframe and may also be throughout the entire subframe.

Herein, the second transmission node transmits the second feedback information to the first transmission node after receiving the data transmitted by the first transmission node over the detected resource in the configuration information.

Herein, the second transmission node may blindly detect the synchronization signal, determine the start location of the detected resource in the configuration information and receive broadcast information according to the location of the synchronization signal.

The data transmission method according to an embodiment of the present disclosure further includes that:

the second transmission node receives a synchronization signal and/or broadcast channel within the second predefined time window, herein the synchronization signal is received periodically within the second predefined time window and the broadcast channel is received merely once at the front end of the second predefined time window or after a first synchronization signal is received.

For example, the second transmission node receives the synchronization signal by taking T ms as a period and receives synchronization signal on the first OFDM symbol and/or the second OFDM symbol of the second predefined time window, and receives the broadcast channel on the first to $h^{th}$ OFDM symbols after the synchronization channel, herein h is a positive integer, and T is a positive integer and may be 5 or 10; or, the second transmission node receives the broadcast channel within the second predefined time window and receives the broadcast channel on the first to $h^{th}$ OFDM symbols of the second predefined time window.

Herein, the synchronization signal is transmitted with a predefined bandwidth of the central frequency point of the system bandwidth and the broadcast bandwidth is transmitted with a predefined bandwidth of the central frequency point of the system bandwidth, the predefined bandwidth is less than or equal to the system bandwidth.

Hereinafter, the method according to an embodiment of the present disclosure will be described in detail in combination with application examples.

In the embodiment, the first transmission node is a base station and the second transmission node is a user equipment; and the first transmission node and the second transmission node may also correspond to other scenarios which are not limited to the following description, such as base station and base station, user equipment and user equipment and so on.

Application Example 1

Figure 2:
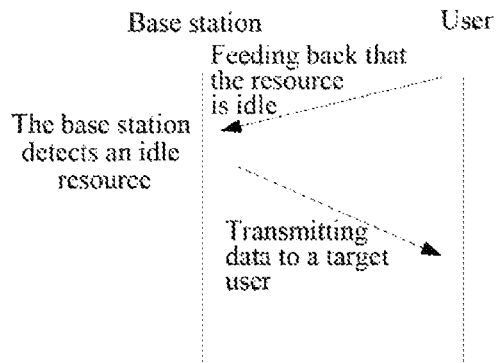
FIG. 2 is a flowchart of a data transmission method according to application example 1 of the present disclosure.

Referring to FIG. 2, it is assumed that a base station aggregates grant spectrum resources and non-grant spectrum resources, a user equipment is arranged to feed back a non-grant spectrum resource state, the user equipment feeds back the non-grant spectrum resource state through a grant spectrum resource, and the base station performs data transmission scheduling according to the non-grant spectrum resource state fed back by the user equipment.

When the user equipment feeds back that the non-grant spectrum resource is idle, then the base station acquires the non-grant spectrum resource for performing data transmission with the user equipment.

When the user equipment feeds back that the non-grant spectrum resource is busy, then the base station cannot acquire the non-grant spectrum resource for performing data transmission with the user equipment.

In this example, the data transmission process is mainly used for the scenario where the base station transmits data to the user equipment in a BF transmission manner.

Application Example 2

Figure 3:
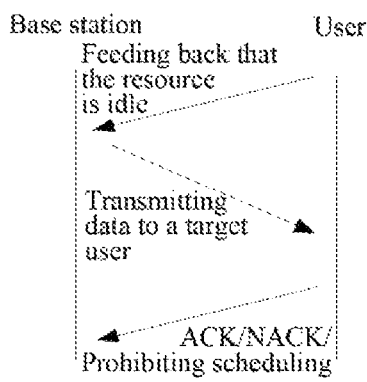
FIG. 3 is a flowchart of a data transmission method according to application example 2 of the present disclosure.

Referring to FIG. 3, it is assumed that a base station aggregates grant spectrum resources and non-grant spectrum resources, a user equipment is arranged to feed back a non-grant spectrum resource state and detects the non-grant spectrum resource state per se, the user equipment feeds back the non-grant spectrum resource state through a grant spectrum, and the base station performs data transmission scheduling according to the non-grant spectrum resource state fed back and detected per se by the user equipment.

When the user equipment feeds back that the non-grant spectrum resource is idle and the base station detects that the non-grant spectrum resource is idle, then the base station acquires the non-grant spectrum resource for performing data transmission with the user equipment.

When the user equipment feeds back that the non-grant spectrum resource is busy or the base station detects that the non-grant spectrum resource is busy, then the base station cannot acquire the non-grant spectrum resource for performing data transmission with the user equipment.

In example 1 or 2, the base station or the user equipment obtains the non-grant spectrum resource state by detecting the interference intensity or energy of the non-grant spectrum resource.

The interference intensity or energy may be the average interference intensity or energy of one or more sub-bands or one or more sub-bands with small interference intensity or energy or interference intensity or energy of a specified sub-band.

In example 1 or 2, when the user equipment detects the non-grant spectrum resource, the base station does not use this non-grant spectrum resource to transmit data so as to reduce the influence to the detection by the user equipment and ensure that the interference detected by the user equipment is generated by other transmission nodes.

In example 1 or 2, the user equipment may feed back the grade of the non-grant spectrum resource state, for example, the interference intensity is quantified into several grades, different grades correspond to different interference intensity ranges, or the energy is quantified into several grades, different grades correspond to different energy ranges.

The user equipment may feed back that the non-grant spectrum resource state is idle or busy and a specific threshold is predefined, when the detection value exceeds this threshold, the state is busy, the detection value is below the threshold, the state is idle; or feed back that the non-grant spectrum resource state is available or unavailable; or feed back whether the detection value of the non-grant spectrum resource exceeds the threshold.

In example 1 or 2, the feedback method may be that an idle is detected within a second preset time and feedback is performed once; or feedback can be performed at any time within the second preset time, or feedback may be performed at a specific time according to the period and offset; or feedback may be performed when a specific signal (such as an occupation signal/request signal) is detected or feedback may be performed when a trigger signaling is received from the base station.

The trigger signaling includes one or more of: schedule information (such as uplink grant information DCI Format 0) corresponding to Physical Uplink Shared Channel (PUSCH) or dedicated trigger information (such as downlink control information for triggering PUCCH feedback); and the dedicated trigger information includes one or more of: feedback channel resource location information, feedback mode information, feedback component carrier information, feedback channel transmission power control information.

The physical resource carrying feedback information is configured by the base station, for example, PUCCH Format 2/2a/2b or PUCCH Format 3 is configured to perform periodical feedback, or UL Grant is used to trigger the PUSCH to carry feedback information.

In example 1 or 2, the detected resource may be one or more OFDM (Orthogonal Frequency Division Multiplexing) symbols on one or more subframes, and the detection value may be an average of a plurality of detection values over the time domain within one time window and may also be a detection value at a specific moment.

The detection value may be fed back in a manner of CSI based on the specific reference signal measurement value sent by the base station, for example, used for feedback triggered by the base station, herein when the CSI value is a specific value, it indicates that the interference situation of the non-grant spectrum resource exceeds the threshold or indicates that the non-grant spectrum resource is unavailable.

The location of the detected resource may adopt the location of CSI-RS (Channel-State Information Reference Signal), for example, CSI-RS location of configuration period or some time domain OFDM symbol locations in CRS (Cell-specific Reference Signal), for example, merely the CRS location on the first OFDM symbol in the detected subframe, or the CRS location on the first OFDM symbol of each slot in the subframe or all CRS locations in the subframe; or locations corresponding to some ports in the CRS, such as port 0, or port 0 and port 1, herein CRS port definition and time domain OFDM symbol definition may be combined for use.

In example 1 or 2, the base station transmits the downlink control information through the grant component carrier, and the user equipment detects the downlink control information over the grant component carrier and receives the data transmitted by the base station to itself over the non-grant carrier according to the downlink control information; and the downlink control information includes schedule information corresponding to the data on the non-grant component carrier.

In order to avoid problems that the user equipment encounters detection leaks or the information is not timely, for example, when the base station transmits data to the user equipment on the non-grant spectrum resource, the state corresponding to the non-grant spectrum resource changes and will be used by the other nodes for data transmission, the feedback method of the user equipment needs to be enhanced; and when the user equipment receives the data from the base station, not only Hybrid Automatic Repeat Request (HARQ) is fed back, but also interference information or whether to present the base station from further scheduling information is fed back or the base station is suggested to delay the information scheduling. For example, for a single codeword stream data, 2-bit information may be fed back and correspond to four states, ACK+resource available, NACK+resource available, ACK+resource unavailable, and NACK+resource unavailable, herein ACK/NACK is the feedback for the data sent by the base station, and whether the resource is available is the feedback for the resource state detected by the user equipment currently; and it may also correspond to three states, ACK+resource available, NACK+resource available and NACK+resource unavailable; similarly, dual codeword stream data transmission may correspond to 4 bits, each codeword stream corresponds to 2 bits, and each codeword stream may also correspond to 1 bit, whether this resource is available corresponds to 1 bit, 3 bits totally.

Alternatively, the resource indication and the power indication are combined, and the feedback information includes: ACK/NACK, whether the resource is available, whether the transmission power needs to be lowered when the resource is available, such as ACK+resource available+not to lower power, NACK+resource available+not to lower power, NACK+resource unavailable, and NACK+resource available+to lower power.

The feedback information may be fed back through PUCCH Format 1b and may also be fed back through PUCCH Format 3.

The above information about whether the resource is available may be used as a determination condition for the base station to transmit data to the user equipment over the non-grant spectrum resource subsequently, that is, when unavailable, then no data can be transmitted to the user equipment over the non-grant spectrum resource, and it may also be only a reference factor for the base station to transmit data to user equipment over the resource subsequently, and the base station may lower power and/or adjust MCS grade and then continue transmitting data.

The base station may lower the power autonomously or according to a predefined rule, for example, when the resource is unavailable, the power of the data transmitted to the user equipment by the base station is lowered below a predefined value, or lowered gradually according to the number of times of receiving the information that the non-grant spectrum resource is unavailable, for example, each time an unavailable state is received, the transmission power is lowered by one grade, and one grade may be 3 dB or 6 dB or other values.

The non-grant spectrum resource being unavailable, as a hard decision condition, may be that feedback information that the non-grant spectrum resource is unavailable is received and may also be that the number of times of receiving the feedback information that the non-grant spectrum resource is unavailable is greater than a threshold.

Application Example 3

Figure 4:
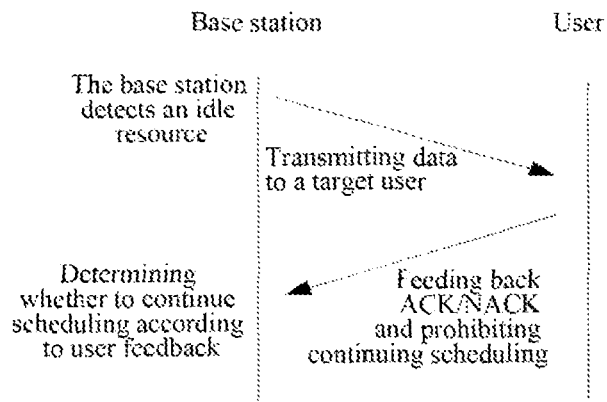
FIG. 4 is a flowchart of a data transmission method according to application example 3 of the present disclosure.

Referring to FIG. 4, the base station detects whether the resource corresponding to a non-grant component carrier is idle, and when the resource is idle, acquires the resource and transmits data to the user equipment through the acquired resource and transmits the downlink control information of the data through a grant component carrier, and the user equipment detects the downlink control information corresponding to the data over the grant component carrier and receives data over the resource corresponding to the non-grant component carrier according to the downlink control information, and the user equipment detects whether the resource corresponding to the non-grant component carrier is available and feeds back to the base station the detected information and the information about whether data are correctly received, or feeds back to the base station the detected information in a manner of CSI and ACK/NACK corresponding to the data.

The resource detected by the user equipment may be a resource for the base station to transmit data, and may also be a corresponding resource of a full bandwidth for carrying data, and may also be a corresponding resource of a sub-band for carrying data.

The user equipment may feed back the state of the full bandwidth, and may also feed back the states of the best one or more sub-bands, or feed back the state of a sub-band specified by the base station, such as a sub-band corresponding to data, or the state of a resource corresponding to data.

The user equipment may feed back the grade of the resource state, for example, the interference intensity is quantified into several grades, different grades correspond to different interference intensity ranges, or the detected energy value is quantified into several grades, different grades correspond to different ranges.

The user equipment may merely feed back an idle or busy state and a specific threshold is predefined, when the detection value exceeds this threshold, the state is busy, otherwise, the state is idle; or feed back that the resource is available or unavailable; or feed back whether the detection value exceeds the threshold.

The detected resource may be one or more OFDM symbols on one or more subframes, and the detection value may be an average of a plurality of detection values over the time domain within one time window and may also be a detection value at a specific moment.

The resource detection location may be the CSI-RS location or some time domain OFDM symbol locations in the CRS, for example, merely the CRS location on the first OFDM symbol in the subframe is detected, or the CRS location on the first OFDM symbol of each slot in the subframe is detected, or all CRS locations in the subframe are detected; or locations corresponding to some ports in the CRS are detected, such as port 0, or port 0 and port 1; or CRS port definition and time domain OFDM symbol definition are combined.

The base station does not transmit data at the detected resource locations which are reserved for the user equipment to perform resource detection.

The detection value indicates the interference situation corresponding to the resource, or the detection value indicates the energy situation of the data transmitted by other transmission nodes except the base station corresponding to the resource.

CSI may be measured according to the reference signal corresponding to data or be measured according to a predefined measurement reference signal (such as non-zero power CSI-RS or CRS on the system bandwidth for transmitting data).

The feedback method may refer to the method described in example 1 and may also adopt ACK/NACK and CSI to perform combined feedback through PUCCH Format 3, or perform combined feedback through a specific PUSCH, or perform feedback through a feedback channel indicated by the downlink control information corresponding to data, herein the feedback channel may be PUCCH or PUSCH.

When the user equipment feeds back that the resource is unavailable, then the base station cannot transmit data to the user equipment over the resource within a subsequent specific time window, or the base station performs autonomous scheduling according to the information, it may also continue scheduling and may also prohibit continuing scheduling; or, the base station continues scheduling data to the user equipment over other resources, or the base station transmits data to the user equipment over another sub-band recommended by the user equipment.

When the user equipment feeds back that the resource is available, then the base station may continues scheduling over the resource, or the base station transmits data to the user equipment over another sub-band recommended by the user equipment.

Application Example 4

Figure 5:
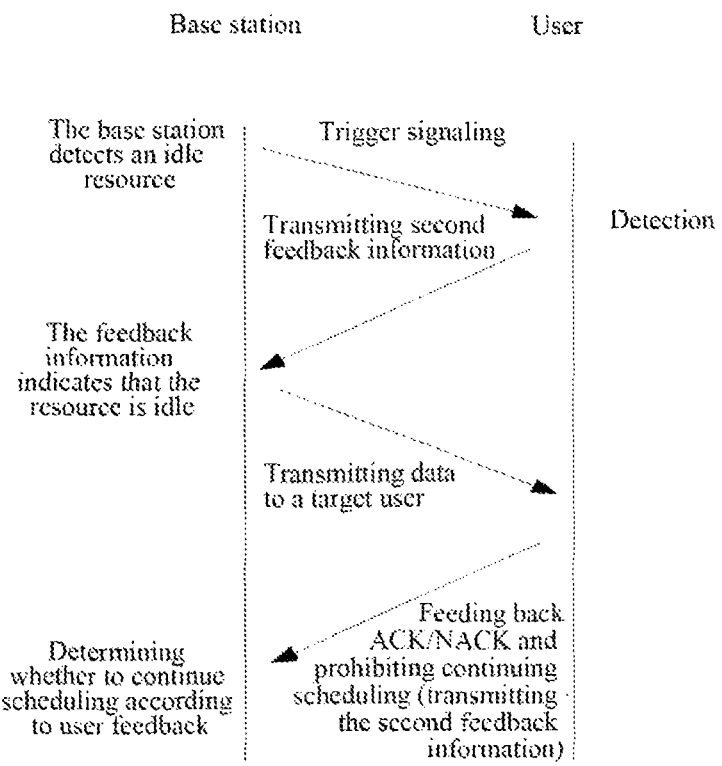
FIG. 5 is a flowchart of a data transmission method according to application example 4 of the present disclosure.

Referring to FIG. 5, the base station detects whether the resource is idle over a non-grant component carrier, and when the resource is idle, the base station transmits a trigger signaling to the user equipment, the user equipment performs resource detection after receiving the trigger signaling and sends second feedback information to the base station, and whether the resource is available is determined according to the feedback information from the user equipment, and when the resource is available, then the resource is acquired and data are transmitted to the user equipment through the acquired resource and the downlink control information of the data is transmitted through a grant component carrier, and the user equipment detects the downlink control information corresponding to the data over the grant component carrier and receives data over the resource corresponding to the non-grant component carrier according to the downlink control information, and the user equipment detects whether the resource is available and feeds back to the base station the detected information and the information about whether the data are correctly, or feeds back to the base station the detected information in a manner of CSI and ACK/NACK corresponding to the data, or the user equipment merely feeds back ACK/NACK corresponding to data.

The base station performs detection based on a specific time window, and when the detection value within the time window is less than a threshold, then it is believed deems that the resource is idle, and when the detection value within the time window is greater than or equal to the threshold, then it is believed that the resource is unavailable.

The time window is continuous time and may include predefined k milliseconds or h OFDM symbols, or t microseconds, herein k, h and t are positive integers.

The detection performed by the user equipment is a detection based on a specific resource including one or more of: zero-power-CSI-RS, CRS, and a specific time domain OFDM symbol.

The detection performed by the user equipment corresponds to the state of a non-grant component carrier within a corresponding time window for the base station to transmit the trigger signaling. The detected information is fed back through the grant component carrier and may also be fed back through PUSCH or PUCCH.

The trigger signaling transmitted by the base station includes: schedule information (such as uplink grant information DCI Format 0) corresponding to PUSCH, or dedicated trigger information (such as downlink control information for triggering PUCCH to feed back); and the dedicated trigger information includes one or more of: feedback channel resource location information, feedback mode information, feedback component carrier information, and feedback channel transmission power control information.

Various information acquisition methods in examples 1 to 4 may be combined with each other.

Application Example 5

The base station may transmit an occupation signal after obtaining a resource, and/or, the user equipment may transmit a temporary occupation signal over a detected resource when detecting that the resource is idle and feeding back to the base station that the resource is idle. Herein, the temporary occupation signal may be a dedicated reference signal, and when the feedback information is transmitted over a non-grant component carrier, the feedback information may also be used as an occupation signal.

The determination conditions for the base station to transmit data to the user equipment with the resource at least includes: the base station detects whether the resource is idle and the feedback information of the user equipment.

The application is as follows:

when the base station detects that the resource is idle and the feedback information indicates that the resource is idle, the base station acquires the right-to-use of the resource and transmits data to the user equipment over the resource; when the base station detects that the resource is idle and the feedback information indicates that the resource is busy, the base station cannot transmit data to the user equipment over the resource; when the base station detects that the resource is busy and the feedback information indicates that the resource is idle, the base station transmits data to the user equipment over the resource in a BF transmission manner; and when the base station detects that the resource is busy and the feedback information indicates that the resource is busy, the base station cannot transmit data to the user equipment over the resource;

or, the user equipment detects a specific occupation signal; when the base station detects that the resource is idle and the feedback information indicates that no occupation signal is detected, the base station acquires the right-to-use of the resource and transmits data to the user equipment over the resource; when the base station detects that the resource is idle and the feedback information indicates that an occupation signal is detected, the base station cannot transmit data to the user equipment over the resource; when the base station detects that the resource is busy and the feedback information indicates that no occupation signal is detected, the base station transmits data to the user equipment over the resource in a BF transmission manner and cannot transmit data in an omnidirectional antenna transmission manner; and when the base station detects that the resource is busy and the feedback information indicates that an occupation signal is detected, the base station cannot transmit data to the user equipment over the resource.

Embodiment 3

Figure 6:
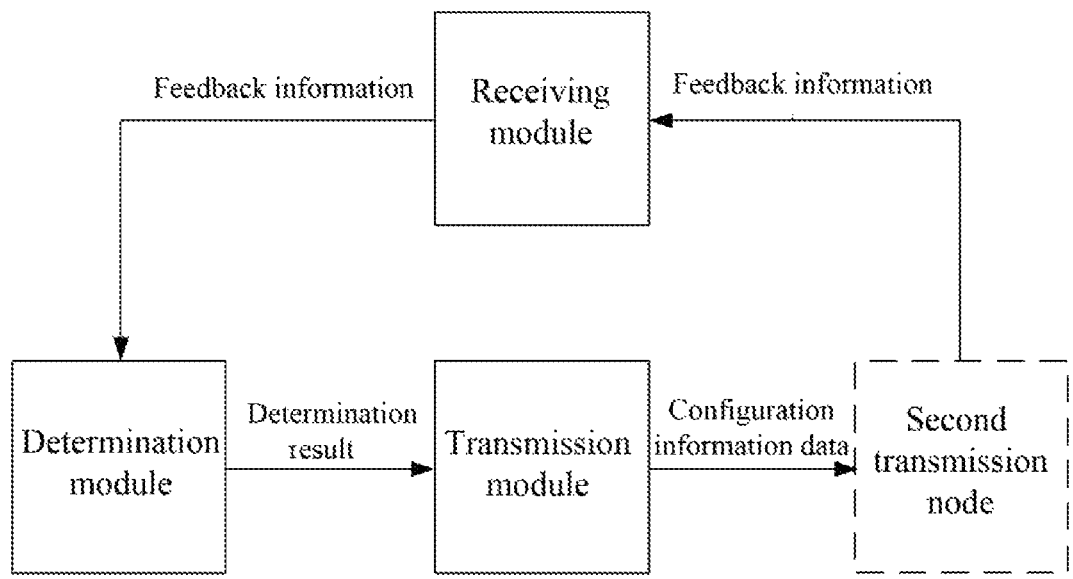
FIG. 6 is a schematic diagram of structural components of a data transmission device according to embodiment 3 of the present disclosure.

Referring to FIG. 6, an embodiment of the present disclosure also proposes a data transmission device, at least including a determination module and a transmission module.

The determination module is arranged to determine that a resource within a second predefined time window is available according to a detection value obtained by performing detection on a resource within a first predefined time window and/or determine that the resource within the second predefined time window is available according to first feedback information or second feedback information from a second transmission node; and transmit a determination result to the transmission module.

The transmission module is arranged to transmit data to the second transmission node using the resource within the second predefined time window.

In the device according to an embodiment of the present disclosure, the determination module is further arranged to:

when it is determined that the resource within the second predefined time window is unavailable according to the detection value obtained by performing the detection on the resource within the first predefined time window, re-determine the first predefined time window and the second predefined time window and continue to determine whether a resource within the re-determined second predefined time window is available.

In the device according to an embodiment of the present disclosure, the determination module is further arranged to:

when it is determined that the resource within the second predefined time window is unavailable according to the first feedback information, re-determine the first predefined time window and the second predefined time window and continue to determine whether the resource within the re-determined second predefined time window is available.

In the device according to an embodiment of the present disclosure, when the determination module determines that the resource within the second predefined time window is unavailable according to the first feedback information, the transmission module does not transmit data to the second transmission node within the second predefined time window; or, the transmission module does not transmit data to the second transmission node any more before the determination module determines that the resource within the second predefined time window is available according to the first feedback information.

In the device according to an embodiment of the present disclosure, the determination module is further arranged to:

determine that the resource within the second predefined time window is unavailable according to the second feedback information; and the transmission module is further arranged to:

not transmit data to the second transmission node within the second predefined time window; or, not transmit data to the second transmission node any more before the determination module receives the first feedback information or determines that the resource within the second predefined time window is available according to the first feedback information; or transmit data to the second transmission node within the second predefined time window again, with a power for transmitting the data being lower than a power for transmitting data before the second feedback information is received or a power for transmitting the data being reduced to a specific value.

In the device according to an embodiment of the present disclosure, the determination module is further arranged to:

determine that a sub-band for transmitting data in the resource within the second predefined time window is unavailable according to the second feedback information; and the transmission module is further arranged to:

transmit data to the second transmission data over another sub-band in the resource within the second predefined time window; when the second feedback information indicates to lower a the transmission power, transmit data to the second node within the second predefined time window again, with the power for transmitting the data being lower than the power for transmitting data before the second feedback information is received.

In the device according to an embodiment of the present disclosure, the second predefined time window is later than the first predefined time window.

In the device according to an embodiment of the present disclosure, the determination module is further arranged to determine whether the resource within the second predefined time window is available; and the transmission module is further arranged to transmit a synchronization signal and/or broadcast channel within the second predefined time window when the determination module determines that the resource within the second predefined time window is available and before transmitting data to the second transmission node using the resource within the second predefined time window, herein the synchronization signal is transmitted periodically within the second predefined time window and the broadcast channel is transmitted merely once at the front end of the second predefined time window or after a first synchronization signal is transmitted.

For example, the synchronization signal may be transmitted with T milliseconds as a period and is located on the first OFDM symbol and/or the second OFDM symbol of the second predefined time window, and the broadcast channel is located on the first to $h^{th}$ OFDM symbols after the synchronization channel, herein h is a positive integer, and T is a positive integer and may be 5 or 10; or, the first transmission node transmits the broadcast channel within the second predefined time window and the broadcast channel is located on the first to $h^{th}$ OFDM symbols of the second predefined time window.

In the device according to an embodiment of the present disclosure, the first feedback information at least includes one of the following:

whether the resource within the second predefined time window is available;

a detection value of a resource within a third predefined time window; and whether the detection value of the resource within the third predefined time window is less than a second threshold.

In the device according to an embodiment of the present disclosure, the second feedback information at least includes one of the following:

acknowledgement message ACK/non-acknowledgement message NACK;

occupation information about the resource within the second predefined time window;

a specific signal is detected over the resource within the third predefined time window;

whether the resource within the second predefined time window is available;

a detection value of the resource within the third predefined time window;

whether the detection value of the resource within the third predefined time window is less than a second threshold;

availability information about a system bandwidth resource corresponding to the resource within the second predefined time window;

channel state information CSI corresponding to the resource within the second predefined time window;

CSI for the bandwidth for transmitting data;

type information of a detected signal;

cell identity information corresponding to the detected signal;

transmission power indicator; and interference intensity indicator.

In the device according to an embodiment of the present disclosure, the transmission module is further arranged to: transmit configuration information to the second transmission node.

In the device according to an embodiment of the present disclosure, the configuration information includes one or more of the following: detection period, information corresponding to a detected resource, frequency point information, system bandwidth, time frequency location of a reference signal corresponding to a detected resource, feedback mode information, and feedback trigger information.

In the device according to an embodiment of the present disclosure, the transmission module is further arranged to: transmit configuration information to the second transmission node over a subframe of a grant component carrier.

The device according to an embodiment of the present disclosure proposes further includes:

a receiving module arranged to receive the first feedback information from the second transmission node over the grant resource; and/or, receive the second feedback information from the second transmission node over a grant resource or non-grant resource.

In the device according to an embodiment of the present disclosure, the receiving module is further arranged to:

receive the first feedback information according to configuration information; and/or, receive the second feedback information after transmitting data.

In the device according to an embodiment of the present disclosure, the transmission module is further arranged to: when the second transmission node performs interference or energy detection on the detected resource in the configuration information, not transmit data over the detected resource in the configuration information.

Embodiment 4

Figure 7:
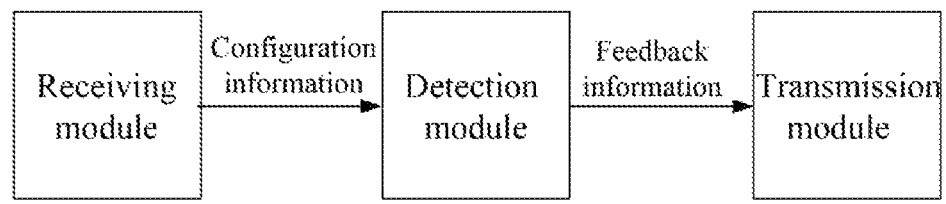
FIG. 7 is a schematic diagram of structural components of another data transmission device according to embodiment 4 of the present disclosure.

Referring to FIG. 7, An embodiment of the present disclosure also proposes a data transmission device, at least including:

a receiving module arranged to receive configuration information from a first transmission node;

a detection module arranged to perform detection on a resource within a first predefined time window according to received configuration information to obtain first feedback information, or, perform detection on a resource corresponding to the first transmission node transmitting data to obtain second feedback information; and a transmission module arranged to transmit the obtained feedback information to the first transmission node.

In the device according to an embodiment of the present disclosure, the configuration information includes one or more of detection period, detected resource relevant information, frequency point information, system bandwidth, feedback method, time frequency location of a reference signal corresponding to a detected resource, and feedback trigger information.

In the device according to an embodiment of the present disclosure, the transmission module is arranged to:

transmit the obtained first feedback information or second feedback information to the first transmission node when the detection module detects that the detected resource in the configuration information is idle or detects a specific signal or receives a trigger signaling from the first transmission node.

In the device according to an embodiment of the present disclosure, the transmission module is further arranged to: transmit the second feedback information to the first transmission node after receiving data.

In the device according to an embodiment of the present disclosure, the receiving module is further arranged to:

receive a synchronization signal and/or broadcast channel within the second predefined time window, herein the synchronization signal is received periodically within the second predefined time window and the broadcast channel is received merely once at the front end of the second predefined time window or after a first synchronization signal is received.

For example, the second transmission node receives the synchronization signal by taking T ms as a period and receives the synchronization signal on the first OFDM symbol and/or the second OFDM symbol of the second predefined time window, and receives the broadcast channel on the first to $h^{th}$ OFDM symbols after the synchronization channel, h is a positive integer, T is a positive integer and may be 5 or 10; or, the second transmission node receives the broadcast channel within the second predefined time window and receives the broadcast channel on the first to $h^{th}$ OFDM symbols of the second predefined time window.

In the device according to an embodiment of the present disclosure, the detection module is further arranged to detect whether the state information in the configuration information is mute state; and the transmission module is further arranged to: when the detection module detect that the state information in the configuration information is mute state, not transmit the first feedback information or the second feedback information.

In the device according to an embodiment of the present disclosure, the transmission module is arranged to:

transmit the obtained first feedback information or second feedback information to the first transmission node over a grant component carrier.

In the device according to an embodiment of the present disclosure, the transmission module is arranged to:

transmit the obtained first feedback information or second feedback information to the first transmission node over a subframe (n+k) of the grant component carrier; where n is the subframe by which the first transmission node transmits feedback trigger information or the subframe by which the first transmission node transmits data and k is 1 or 2, or 3 or 4 or determined according to the uplink and downlink resource configuration of the grant component carrier.

In the device according to an embodiment of the present disclosure, the transmission module is arranged to:

transmit the obtained first feedback information or second feedback information over a non-grant component carrier in a broadcast manner.

In the device according to an embodiment of the present disclosure, the first feedback information includes:

whether the detected resource in the configuration information or the system bandwidth resource corresponding to the detected resource is available, or a detection value of the detected resource or the system bandwidth resource corresponding to the detected resource, or whether the detection value of the detected resource or the system bandwidth resource corresponding to the detected resource is less than a second threshold.

In the device according to an embodiment of the present disclosure, the second feedback information at least includes one of the following:

acknowledgement message ACK/non-acknowledgement message NACK;

occupation information about the resource within the second predefined time window;

a specific signal is detected over a resource within a third predefined time window;

whether the resource within the second predefined time window is available;

a detection value of the resource within the third predefined time window;

whether the detection value of the resource within the third predefined time window is less than a second threshold;

availability information about a system bandwidth resource corresponding to the resource within the second predefined time window;

CSI corresponding to the resource within the second predefined time window;

CSI for the bandwidth for transmitting data;

type information of a detected signal;

cell identity information corresponding to the detected signal;

transmission power indicator; and interference intensity indicator.

An embodiment of the present disclosure also provides a computer-readable storage medium which stores computer-executable instructions for executing the above information feedback method and transmission method applied to the first transmission node.

It should be understood by those skilled in the art that the embodiments of the present application may be provided as methods, systems or computer program products. Thus, the present application may adopt hardware embodiments, software embodiments, or embodiments combined with software and hardware. Moreover, various embodiments of the present application may be embodied by computer program products implemented on one or more computer-usable storage medium (including but not limited to magnetic disk memories and optical memories and so on) containing computer-usable program codes.

The present application is described according to the flowcharts and/or block diagrams of the methods, devices (systems) and computer program products in the embodiments of the present disclosure. It should be understood that each flow and/or block in the flowcharts and/or block diagrams and combination of the flow and/or block in the flowcharts and/or block diagrams may be implemented with computer program instructions. These computer program instructions may be provided to the processors such as a general-purpose computer, a dedicated-purpose computer, an embedded processor or other programmable data processing device to generate a machine, so that the instructions executed by the processors such as a computer or other programmable data processing device generate a device for implementing the functions specified in one or more flows of the flowcharts or one or more blocks of the block diagrams.

These computer program instructions may also be stored in a computer-readable memory which may guide a computer or other programmable data processing device to operate in a specific manner, so that the instructions stored in the computer-readable memory generate an article of manufacture including an instruction apparatus which can implement the functions specified in one or more flows of the flowcharts or one or more blocks of the block diagrams.

These computer program instructions may be loaded in a computer or other programmable data processing device, so that a series of operation steps are executed by the computer or other programmable data processing device to realize computer-implemented processing, and thus the instructions executed by the computer or other programmable data processing device provide steps for implementing the functions specified in one or more flows of the flowcharts or one or more blocks of the block diagrams.

INDUSTRIAL APPLICABILITY

In the embodiments of the present disclosure, the resource within the second predefined time window (including a grant spectrum resource and a non-grant spectrum resource) is effectively utilized to transmit data, improving data transmission efficiency.

What we claim is:

1. A data transmission method, comprising:
    transmitting, by a first transmission node, configuration information to a second transmission node, wherein the configuration information comprises one or more of the following: information corresponding to a detected resource, time frequency location of a reference signal corresponding to a detected resource, and feedback mode information,
    determining, by the first transmission node, that an unlicensed resource within a second predefined time window is available according to a detection value obtained by performing detection on an unlicensed resource within a first predefined time window, wherein the detection value comprises a detection value for channel quality information or interference information, or an energy detection value; and
    transmitting, by the first transmission node, data to the second transmission node using the an unlicensed resource within the second predefined time window,
    wherein the second transmission node transmits obtained first feedback information or second feedback information to the first transmission node over a licensed component carrier,
    wherein the second transmission node transmits the obtained first feedback information or second feedback information to the first transmission node over a subframe n+k of the licensed component carrier, wherein subframe n is a subframe by which the first transmission node transmits feedback trigger information or a subframe by which the first transmission node transmits data, and k is 1, 2, 3 or 4 or determined according to uplink and downlink resource configuration of the licensed component carrier.

2. The data transmission method according to claim 1, further comprising:
    when the first transmission node determines that the unlicensed resource within the second predefined time window is unavailable according to the detection value obtained by performing the detection on the unlicensed resource within the first predefined time window, re-determining, by the first transmission node, the first predefined time window and the second predefined time window, and continuing to perform a step of determining whether a unlicensed resource within the re-determined second predefined time window is available.

3. The data transmission method according to claim 1, wherein the first transmission node receives first feedback information according to configuration information; and/or, the first transmission node receives second feedback information after transmitting data, and the first transmission node determines that the unlicensed resource within the second predefined time window is available according to the first feedback information or the second feedback information from the second transmission node.

4. The data transmission method according to claim 1, wherein when the unlicensed resource within the second predefined time window is available, before transmitting, by the first transmission node, data to the second transmission node using the unlicensed resource within the second predefined time window, the method further comprises:
  transmitting, by the first transmission node, a synchronization signal and/or broadcast channel within the second predefined time window, wherein the synchronization signal is transmitted periodically within the second predefined time window and the broadcast channel is transmitted merely once at a front end of the second predefined time window or after a first synchronization signal is transmitted.

5. The data transmission method according to claim 3, wherein the first feedback information comprises one of the following:
  whether the unlicensed resource within the second predefined time window is available;
  a detection value of a unlicensed resource within a third predefined time window; and
  whether the detection value of the unlicensed resource within the third predefined time window is less than a second threshold.

6. The data transmission method according to claim 3, wherein the second feedback information comprises one of the following:
  acknowledgement message ACK/non-acknowledgement message NACK;
  occupation information about the unlicensed resource within the second predefined time window;
  information that a specific signal is detected over the unlicensed resource within the third predefined time window;
  whether the unlicensed resource within the second predefined time window is available;
  a detection value of the unlicensed resource within the third predefined time window;
  whether the detection value of the unlicensed resource within the third predefined time window is less than a second threshold;
  availability information about a system bandwidth resource corresponding to the unlicensed resource within the second predefined time window;
  channel state information CSI corresponding to the unlicensed resource within the second predefined time window;
  CSI for a bandwidth for transmitting data;
  type information of a detected signal;
  cell identity information corresponding to the detected signal;
  transmission power indicator; and
  interference intensity indicator.

7. The data transmission method according to claim 1, wherein the first transmission node transmits configuration information to the second transmission node over a subframe of a licensed component carrier.

8. The data transmission method according to claim 1, wherein the first transmission node receives first feedback information from the second transmission node over a licensed resource; and/or, the first transmission node receives second feedback information from the second transmission node over a licensed resource or unlicensed resource.

9. The data transmission method according to claim 1, wherein when the second transmission node performs interference or energy detection on the detected resource in the configuration information, the first transmission node does not transmit data over the detected resource in the configuration information.

10. A data transmission method, comprising:
  performing detection, by a second transmission node, on an unlicensed resource within a first predefined time window according to configuration information received from a first transmission node to obtain first feedback information, or, performing detection, by the second transmission node, on an unlicensed resource corresponding to the first transmission node transmitting data to obtain second feedback information and transmitting the obtained first feedback information or second feedback information to the first transmission node, wherein the first feedback information comprises: a detection value of the detected resource or the system bandwidth resource corresponding to the detected resource, or whether the detection value of the detected resource or the system bandwidth resource corresponding to the detected resource is less than a second threshold, wherein the detection value comprises a detection value for channel quality information or interference information, or an energy detection value;
  the configuration information comprises one or more of the following: information corresponding to a detected resource, time frequency location of a reference signal corresponding to a detected resource, and feedback mode information,
  receiving, by the second transmission node, a synchronization signal and/or broadcast channel within a second predefined time window, wherein the synchronization signal is received periodically within the second predefined time window and the broadcast channel is received merely once at a front end of the second predefined time window or after a first synchronization signal is received,
  wherein the second transmission node transmits obtained first feedback information or second feedback information to the first transmission node over a licensed component carrier,
  wherein the second transmission node transmits the obtained first feedback information or second feedback information to the first transmission node over a subframe n+k of the licensed component carrier; wherein subframe n is a subframe by which the first transmission node transmits feedback trigger information or a subframe by which the first transmission node transmits data, and k is 1, 2, 3 or 4 or determined according to uplink and downlink resource configuration of the licensed component carrier.

11. The data transmission method according to claim 10, wherein the second transmission node transmits the obtained first feedback information or second feedback information to the first transmission node when detecting that the detected resource in the configuration information is idle or detecting a specific signal or receiving a trigger signaling from the first transmission node.

12. The data transmission method according to claim 10, further comprising: transmitting, by the second transmission node, the second feedback information to the first transmission node after receiving data.

13. The data transmission method according to claim 10, wherein the configuration information comprises current state information about the first transmission node; and
  the method further comprises: when the second transmission node detects that the state information in the configuration information is mute state, not transmitting, by the second transmission, the first feedback information or the second feedback information.

14. The data transmission method according to claim 10, wherein the second transmission node transmits the obtained first feedback information or second feedback information over an unlicensed component carrier in a broadcast manner.

15. The data transmission method according to claim 10, wherein the first feedback information further comprises:
whether the detected resource in the configuration information or the system bandwidth resource corresponding to the detected resource is available.

16. The data transmission method according to claim 10, wherein the second feedback information comprises one of the following:
acknowledgement message ACK/non-acknowledgement message NACK;
occupation information about the unlicensed resource within the second predefined time window;
information that a specific signal is detected over an unlicensed resource within a third predefined time window;
whether the unlicensed resource within the second predefined time window is available;
a detection value of the unlicensed resource within the third predefined time window;
whether the detection value of the unlicensed resource within the third predefined time window is less than a second threshold;
availability information about a system bandwidth resource corresponding to the resource within the second predefined time window;
channel state information CSI corresponding to the unlicensed resource within the second predefined time window;
CSI for a bandwidth for transmitting data;
type information of a detected signal;
cell identity information corresponding to the detected signal;
transmission power indicator; and
interference intensity indicator.

17. A data transmission device, comprising a processor and a storage device, wherein the storage device stores processor-executable programs, and the programs comprise a determination module and a transmission module, wherein
the determination module is arranged to determine that an unlicensed resource within a second predefined time window is available according to a detection value obtained by performing detection on an unlicensed resource within a first predefined time window, wherein the detection value comprises a detection value for channel quality information or interference information, or an energy detection value; to transmit a determination result to the transmission module; and
the transmission module is arranged to transmit data to a second transmission node using the unlicensed resource within the second predefined time window, and transmit configuration information to the second transmission node, wherein the configuration information comprises one or more of the following: information corresponding to a detected resource, time frequency location of a reference signal corresponding to a detected resource, and feedback mode information,
wherein the second transmission node transmits obtained first feedback information or second feedback information to the data transmission device over a licensed component carrier,
wherein the second transmission node transmits the obtained first feedback information or second feedback information to the data transmission device over a subframe n+k of the licensed component carrier; wherein subframe n is a subframe by which the data transmission device transmits feedback trigger information or a subframe by which the data transmission device transmits data, and k is 1, 2, 3 or 4 or determined according to uplink and downlink resource configuration of the licensed component carrier.

18. A data transmission device, comprising a processor and a storage device, wherein the storage device stores processor-executable programs, and the programs comprise:
a receiving module arranged to receive configuration information from a first transmission node; to receive a synchronization signal and/or broadcast channel within a second predefined time window, wherein the synchronization signal is received periodically within the second predefined time window and the broadcast channel is received merely once at a front end of the second predefined time window or after a first synchronization signal is received;
a detection module arranged to perform detection on an unlicensed resource within a first predefined time window according to received configuration information to obtain first feedback information, or, perform detection on an unlicensed resource corresponding to the first transmission node transmitting data to obtain second feedback information; and
a transmission module arranged to transmit the obtained feedback information to the first transmission node,
wherein the first feedback information comprises: a detection value of the detected resource or the system bandwidth resource corresponding to the detected resource, or whether the detection value of the detected resource or the system bandwidth resource corresponding to the detected resource is less than a second threshold, wherein the detection value comprises a detection value for channel quality information or interference information, or an energy detection value;
the configuration information comprises one or more of the following: information corresponding to a detected resource, time frequency location of a reference signal corresponding to a detected resource, and feedback mode information,
wherein the transmission module is arranged to transmit obtained first feedback information or second feedback information to the first transmission node over a licensed component carrier,
wherein the transmission module is arranged to transmit the obtained first feedback information or second feedback information to the first transmission node over a subframe n+k of the grant component carrier, where n is a subframe by which the first transmission node transmits feedback trigger information or a subframe by which the first transmission node transmits data, and k is 1, 2, 3 or 4 or determined according to uplink and downlink resource configuration of the licensed component carrier.

19. The data transmission device according to claim 17, wherein the programs further comprise:
a receiving module arranged to receive first feedback information from the second transmission node over a licensed resource; and/or receive second feedback information from the second transmission node over a licensed resource or unlicensed resource;

wherein the receiving module is further arranged to receive the first feedback information according to the configuration information; and/or, receive the second feedback information after transmitting data.

20. The data transmission device according to claim 19, wherein the determination module is further arranged to determine that the unlicensed resource within the second pre-defined time window is available according to the first feedback information or the second feedback information from a second transmission node.

* * * * *